United States Patent [19]

Lillie

[11] Patent Number: 4,590,557
[45] Date of Patent: May 20, 1986

[54] METHOD AND APPARATUS FOR CONTROLLING SOFTWARE CONFIGURATIONS IN DATA PROCESSING SYSTEMS

[75] Inventor: Terrance L. Lillie, Palo Alto, Calif.

[73] Assignee: Pitney Bowes Inc., Stamford, Conn.

[21] Appl. No.: 530,931

[22] Filed: Sep. 12, 1983

[51] Int. Cl.⁴ .......................... G06F 9/06; G06F 12/14
[52] U.S. Cl. ..................................................... 364/200
[58] Field of Search ........................ 364/200, 300, 900

[56] References Cited

U.S. PATENT DOCUMENTS

| | | | |
|---|---|---|---|
| 4,014,005 | 3/1977 | Fox et al. | 364/200 |
| 4,446,519 | 5/1984 | Thomas | 364/300 |
| 4,481,578 | 11/1984 | Hughes et al. | 364/200 |
| 4,497,021 | 1/1985 | Fukuda et al. | 364/200 |
| 4,497,040 | 1/1985 | Gomes et al. | 364/900 |

*Primary Examiner*—James D. Thomas
*Assistant Examiner*—David L. Clark
*Attorney, Agent, or Firm*—Robert H. Whisker; William D. Soltow, Jr.; Dave E. Pitchenik

[57] ABSTRACT

A data processing system including a method and apparatus for controlling software configurations. A plurality of software programs and routines are stored in a mass storage device. Which software accessed by the system is controlled by non-volatile information stored in the system. The system also includes a portable media storage device, such as a floppy disk drive, and fixed information which loads a preselected portion of the portable media into the system. Two portable media are also provided. The preselected portion of the first portable media contains a bootstrap program which loads an operating system into the system. The preselected portion of the second portable media contains a program for altering the non-volatile information stored in the system so as to change the software configuration which may be accessed by the system. The program then erases the preselected portion of the second portable media after execution. In a preferred embodiment, the program also includes a counter containing a preselected number which is decremented after each time the program is executed and the program does not erase the preselected region until the counter reaches zero.

15 Claims, 5 Drawing Figures

METHOD AND APPARATUS FOR CONTROLLING SOFTWARE CONFIGURATIONS IN DATA PROCESSING SYSTEMS

BACKGROUND OF THE INVENTION

As is well known, in recent years, declining prices coupled with improved performance have revolutionized the marketing of small data processing systems such as personal computers and word processors. Data processing systems are no longer used almost entirely by scientists, engineers and data processing professionals but are now commonly used by businessmen, students, doctors, lawyers and other individuals who are not familiar with computer science. Such people generally are not skilled programmers and are not interested in becoming one. Rather, they want to use their data processing systems as convenient tools to solve their problems.

As a result, a vast new industry has sprung up to develop and market software for such individuals. Such software is normally marketed in the form of portable media such as floppy disks or tape cassettes. However, since such media are both portable and reusable and since the market for small data processing systems is so diffuse, unauthorized copying of software has become a major problem for the new software industry. Attempts to encode such software so that it could not be copied have generally not been successful since other software designed to decode and copy encoded software was rapidly developed and marketed.

Another problem faced by both the software industry and users has been the problem of inventory control. As available software proliferated, the problem of accounting for numerous items of portable media grew rapidly.

One approach taken by manufacturers of systems has been to provide one item of portable media, typically a floppy disk, containing the operating system and various optional programs such as application programs. ("Operating system" and "application program" are concepts which are well known in the data processing art and generally may be considered as relating to a master program which controls the overall operation of the system and particular programs which, under control of the operating system, perform particular functions to solve particular types of problems. A further description of these concepts is not believed necessary to an understanding of the present invention.) The system was then constructed to include non-volatile information (i.e. information that survives shut-down or power loss), typically in the form of read-only-memory (ROM), defining the optional programs which were available to the operating system.

A major problem with this approach to the problem is that in order to change what optional programs are available, it is necessary to manually alter the physical structure of the system to change the data in the ROM.

Thus, it is an object of the subject invention to provide an apparatus and method for distributing software which will reduce the opportunity for unauthorized copying of such software.

It is another object of the subject invention to provide such apparatus and method which will reduce the inventory control problem for the portable media on which the software is recorded.

It is still another object of the subject invention to provide such a method and apparatus wherein the available software may be easily changed by unskilled persons.

BRIEF SUMMARY OF THE INVENTION

The above objects are achieved and the disadvantages of the prior art are overcome by a data processing system in accordance with the subject invention comprising a processor, a processor memory operatively associated with the processor for storing programs to be executed, a mass storage means for storing data, the data including an operating system and various optional programs, means for transferring said data between the mass storage means and the processor memory so that the operating system and particular optional programs may be loaded in the memory so that said optional programs may be executed under control of the operating system, the transferring means including control means for controlling said transfers in accordance with non-volatile information stored in the control means so that only preselected optional programs may be transferred to the memory. The system of the subject invention further comprises means responsive to the processor for changing the information stored in the control means, portable media storage means for storing data on portable media (such as floppy disks), means containing fixed information for transferring a program from a preselected portion of the portable media to the processor memory for execution, a first portable medium wherein the program stored in the preselected portion is a program for loading the operating system into the processor memory, and a second portable medium wherein the data stored in the preselected portion is a program for altering the information stored in said control means.

In an embodiment of the subject invention, the second portable medium contains additional information in the preselected portion defining the number of times the program stored therein may be loaded into memory, the processor decrementing the number after each time the program is loaded and erasing the program from said second medium when the number equals zero.

In another embodiment of the subject invention, the mass storage means comprises the portable media storage means and the first portable medium stores additional data, the additional data including the operating system.

The subject invention also comprises a method for initializing a data processing system comprising the steps of loading a portable media storage means with a portable medium, loading a preselected portion of the medium into processor memory in accordance with fixed information stored in the system, executing the program stored in the preselected portion of the medium to alter non-volatile information stored in the system, halting the processor, loading another portable medium into the portable medium storage means, loading the same preselected portion of that medium into processor memory in accordance with the fixed information, executing the program stored therein to load the operating system into the processor, the operating system loading various optional programs into memory as needed and in accordance with the availability of the optional programs as indicated by the non-volatile information stored in the data processing system.

In an embodiment of the method of the subject invention, the data processing system erases the non-volatile data altering program after it has been loaded into the system a predetermined number of times.

It should be noted that the entire operating system need not be resident (i.e. loaded into memory at one time), rather it is within the skill of those in the art to write operating systems where only a portion is resident at one time, other portions being "overlayed" (i.e. loaded in place of the resident portion as needed). It is within the scope of the present invention that such portions of the operating system may be "optional programs", as the term has been used in describing the subject invention.

Thus, it may be seen that the subject invention provides an economical means for achieving the above objects while minimizing necessary changes to prior data processing systems. It is particularly advantageous in that it is completely compatible with software written for systems wherein optional program availability was controlled in accordance with fixed information stored in a ROM.

Other objects and advantages of the subject invention will be apparent to those skilled in the art from consideration of the detailed description set forth below and the attached drawings.

BRIEF DESCRIPTION OF THE DRAWINGS

FIG. 4, comprising

DETAILED DESCRIPTION OF PREFERRED EMBODIMENTS

Figure 1:
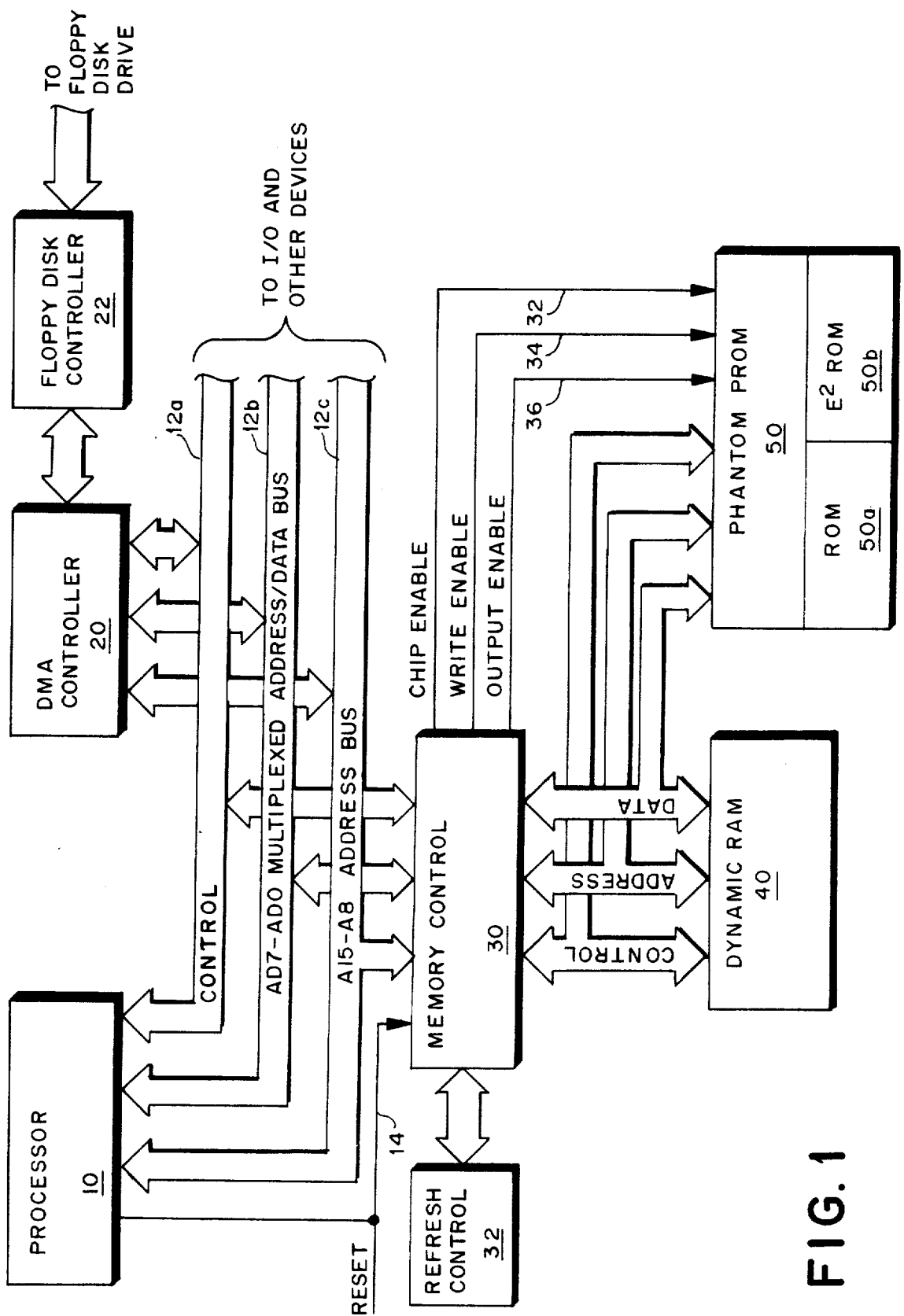
FIG. 1 is a schematic block diagram of a data processing system in accordance with the subject invention.

FIG. 1 shows a typical data processing system in accordance with the subject invention. A processor 10 is operatively connected to a direct memory access (DMA) controller 20 and is operatively connected to a dynamic random access memory (RAM) 40 and a phantom programmable read only memory (PROM) 50 through memory controller 30. The data processing system also includes conventional I/0 devices (not shown), such as CRT terminals and network controllers, through which data may be received by the system for processing and processed data may be transmitted. Typically, processor 10 may be an Intel MCS 8085 microprocessor. DMA 20 may be an Intel MCS 8257 programmable DMA controller.

DMA controller 20 is responsive to commands transmitted from processor 10 over bus 12, which comprises control lines 12a, multiplexed address/data bus 12b and address bus 12. In response to these commands, DMA controller 20 controls floppy disk controller 22 and memory control 30 to transfer blocks of data between a floppy disk drive (not shown), which serves as a mass storage means for the system of FIG. 1, and RAM 40. Portions of the data transferred may comprise programs which are to be executed by processor 10 after they are loaded into RAM 40. Floppy disk controller 22 may be an Intel MCS 8271 programmable floppy disk controller and memory control 30 may comprise an Intel MCS 8202 dynamic RAM controller and additional logic to control phantom PROM 50, as will be further described below, and conventional refresh control 32 to assure that the data in RAM 40 is periodically updated to prevent loss of data.

In normal operation, processor 10 reads instructions and data from RAM 40, executes the instructions on data read from RAM 40, executes I/0 operations, and, also in accordance with program instructions, commands DMA controller 20 to transfer selected blocks of data between the floppy disk and RAM 40. As is well understood in the art such data blocks may include other, optional programs, or routines, for execution by processor 10. Such operation of data processing systems is well understood by those skilled in the art and need not be discussed further for an understanding of the subject invention.

Figure 2:
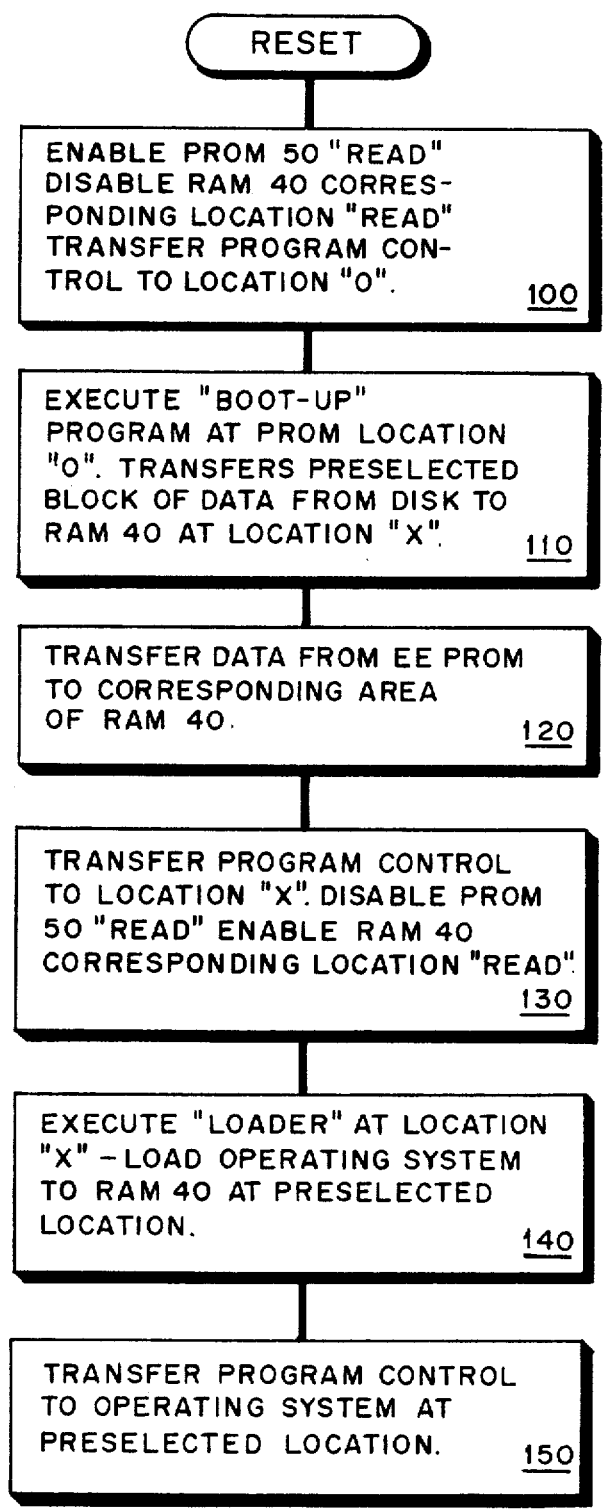
FIG. 2 is a flow chart of the normal system initialization procedure.
Figure 4A:
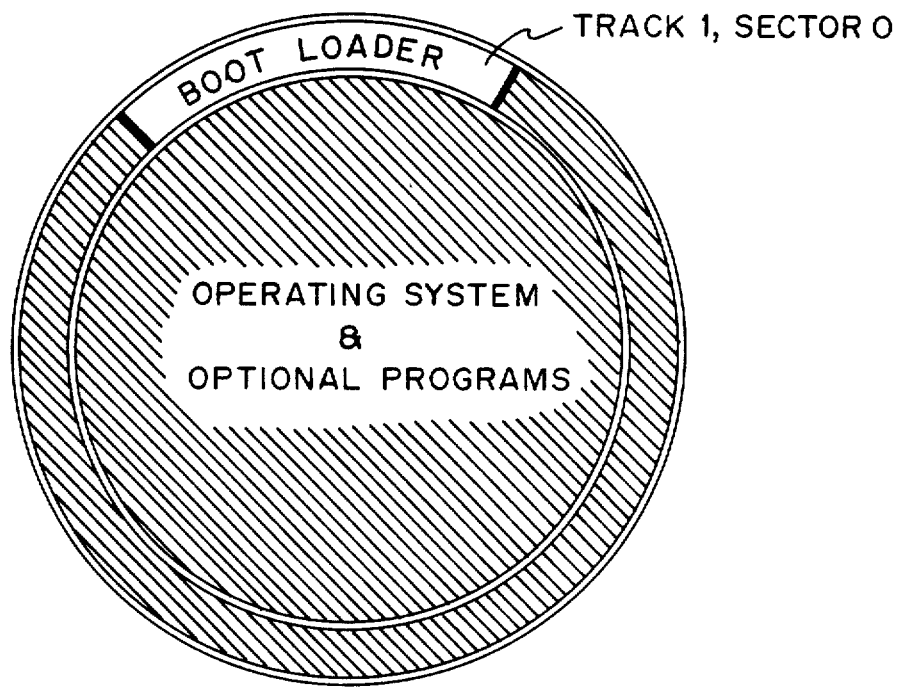
FIGS. 4a and 4b, is a schematic illustration of data stored on portable media.

FIG. 2 shows the operation of the data processing system of FIG. 1 during initialization (i.e. start-up). A signal is generated on reset line 14, either by a power-on condition or by an operator manually initiating a reset. At 100, the reset is sensed by processor 10 which responds by transferring program control to a predetermined location, typically location "0". The reset signal is also sensed by memory control 30 which responds by disabling read operations to RAM 40, enabling PROM 50 on chip enable line 32 and responding to subsequent read operations from processor 10 with output enable signals on line 36, so that all memory read operations during initialization read data from PROM 50. (Write operations still write to RAM 40.) Thus at 110, processor 10 will execute whatever program is stored in PROM 50 beginning at location "0". In the subject invention, this program is a "boot-up" program which loads data from a predetermined portion of a floppy disk loaded in the floppy disk drive (not shown). During initialization, a floppy disk as shown in FIG. 4a is used and the predetermined portion, typically track 1, sector 0, contains an operating system "boot-loader". At 120, after loading the "boot-loader", the "boot-up" program contained in ROM 50a then transfers information contained in EEPROM 50b into RAM 40. The information transferred includes system parameter information which defines the optional programs which are available to the operating system. At 130, the "boot-up" program then commands the memory controller to remove the chip enable on line 32 and re-enable read operations to RAM 40 and transfers program control to the "boot-loader" loaded from the floppy disk. (At this point, PROM 50 "disappears" and is no longer accessible to processor 10, hence the name Phantom PROM.) The "boot-loader" then, at 140, loads the operating system from the floppy disk along with other optional programs, in accordance with the indiciated availability contained in the data loaded from EEPROM 50b, and at 150, transfers control to the operating system. The operating system then loads and executes optional programs, in accordance with the availability shown by the EEPROM information now stored in RAM 40.

RAM 50b, which stores the "boot-up" program may be any of several well known forms of ROM, the only condition being that the "boot-up" program data must be non-volatile (i.e. must indefinitely survive shut-down or power loss). EEPROM 50b is an electrically alterable ROM and may, in accordance with the subject invention and as will be described below, be altered under program control.

Figure 3:
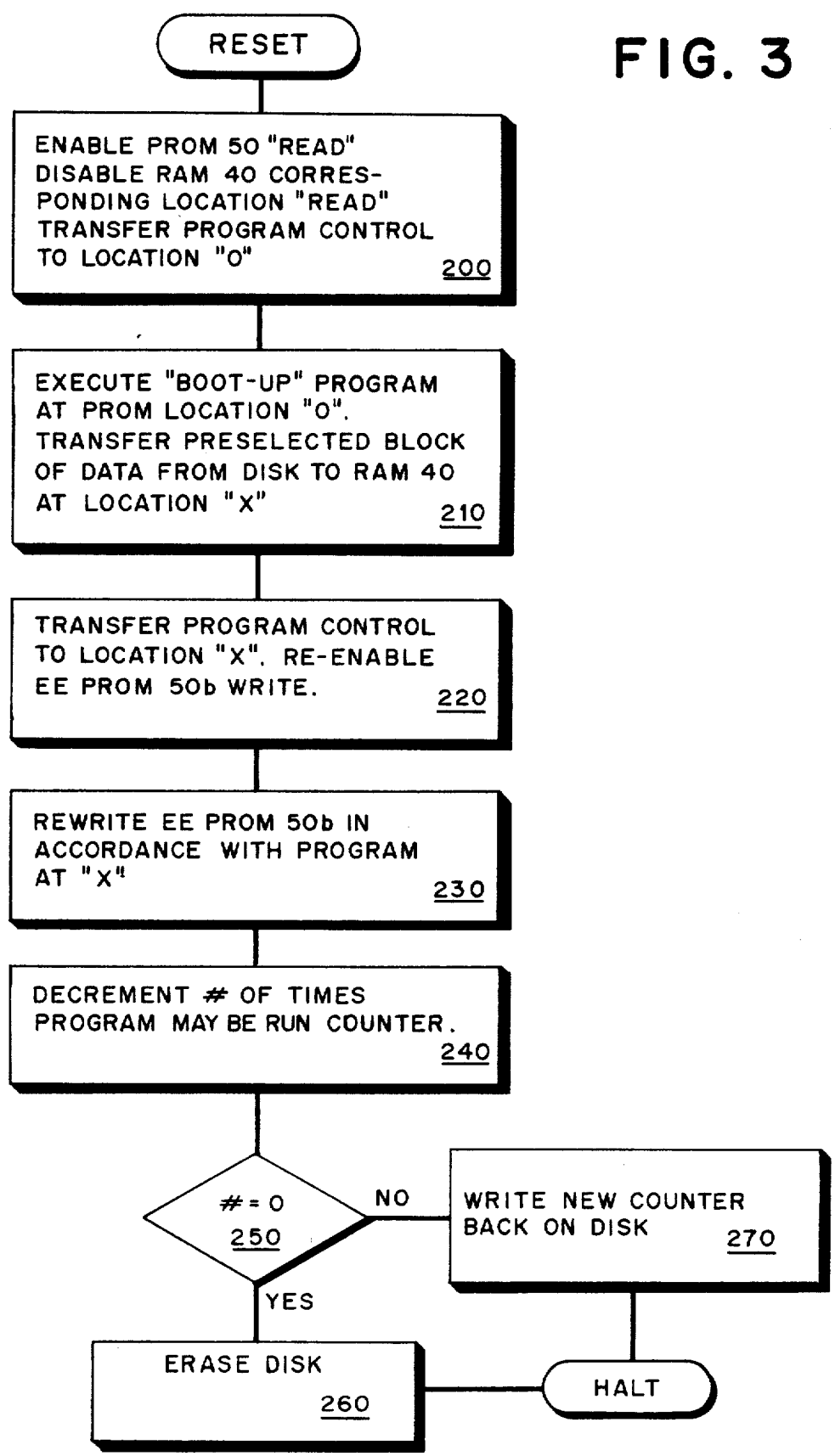
FIG. 3 is a flow chart of the procedure for altering the availability of optional programs.
Figure 4B:
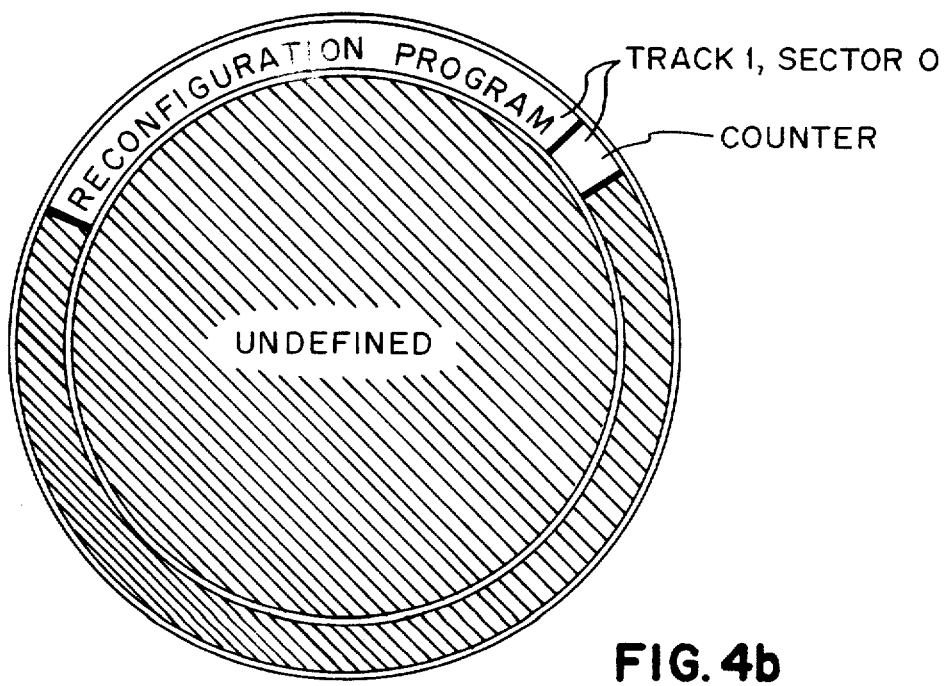

FIG. 3 shows a system reconfiguration operation whereby the availability of optional programs to the system is altered. Again, at 200, a reset signal on line 14 is sensed by processor 10, which transfers program control to location "0" and by memory control 30 which enables read operations to PROM 50 while disabling read operations to RAM 40 for the correspondingly addressed locations. At 210, the "boot-up" program stored in ROM 50a is executed, loading the data stored in the preselected location on the floppy disk into, and transferring control to the program loaded to, RAM 40. Up to this point, the reconfiguration operation has been identical to the initialization operation since both require executing the program stored in ROM 50a. (Though irrelevant steps carried out by that program have not been shown in FIG. 3 for ease of illustration.) However, the disk in the disk drive (not shown) is as shown in FIG. 4b. The preselected portion, again typically track 1, sector 0, now contains new system parameters, redefining the optional programs available to the system and a reconfiguration program for rewriting EEPROM 50b with the new parameters. Preferably, the data also includes a counter defining the number of times the reconfiguration program may be executed.

When control is transferred to the reconfiguration program, the processor will command the memory controller 30 to re-enable EEPROM 50b for write commands. Memory control 30 will enable EEPROM 50b by signaling on chip enable line 32 and will respond to subsequent write commands by signaling on write enable line 34. Those skilled in the art will recognize that EEPROM's have a write time many orders of magnitude greater than RAM's and that memory control 30 must be constructed to allow for this greater time. Techniques for achieving this will be readily apparent to those skilled in the art and need not be discussed further here for an understanding of the subject invention.

At 230, the reconfiguration program is executed and the new system parameters are written into EEPROM 50b. The reconfiguration program then decrements the counter at 240 and tests to see if the number of times the program may be run is equal to zero, at 250. If it is not, the program writes the new counter back onto the disk at 270 and halts. If it is equal to zero, the program erases the preselected portion of the disk by writing halt commands into it and halts, thus preventing unauthorized uses of the reconfiguration program.

The system parameters may be recorded in many ways. Most simply, a single particular bit may be set to "1" or "0" for each optional program in accordance with the availability of that program. Or, preferably, such a bit may be stored both on the system disk as shown in FIG. 4a and in EEPROM 50b and "ANDED" by the operating system to test the availability of particular optional programs. Other more elaborate coding techniques are also within the contemplate of the subject invention.

Those skilled in the art will recognize that interconnection of the above cited components would be well within their ordinary skill. Necessary descriptions of the properties of various suitable components may be found in the MCS 80/85 Family User's Manual, published October 1979 by the Intel Corp. of Santa Clara, Calif. and 5213/5213H Application Note published by SEEQ Technology Inc. San Jose, Calif., published September 1982, which describes 5213 type EEPROMs, and which are hereby incorporated by reference. They will also recognize that the use of "Phantom" PROMS is a well known technique in the art. Further, they will recognize that the system described and shown in FIG. 1 is exemplary and that many other types of components could be used in its implementation and even that other architectures could be used without departing from the spirit of the subject invention. Thus, limitations on the scope of the subject invention are found only in the claims set forth below:

What is claimed is:

1. A data processing system comprising:
   (a) a processor;
   (b) a processor memory connected to said processor for storing programs to be executed by said processor;
   (c) mass storage means for storing data, said data including an operating system and various optional programs for execution by said processor, execution of said operating system controlling execution of said optional programs;
   (d) means for transferring said data between said mass storage means and said processor, so that said operating system and said optional programs are loadable into said memory for execution;
   (e) said transferring means including control means for controlling said transfer as specified by non-volatile information designating selected ones of said optional programs and stored in said control means so that only said designated optional programs are transferable to said memory;
   (f) means for altering said non-volatile information stored in said control means in response to control signals from said processor;
   (g) portable media storage means for storing data on selected portable media, such as floppy disks, used with said media storage means;
   (h) initializing means containing further information for transferring data comprising a program from a portion, selected as specified by said further information, of said portable media to said processor memory for execution by said said processor;
   (i) a portable medium selected for use with said media storage means from the group consisting of;
   (i1) a first selectable portable medium wherein said program stored in said portion of said first medium is a program for altering said non-volatile information stored in said transfer control means and for erasing said program from said first portable medium after execution; and,
   (i2) a second selectable portable medium wherein said program stored in said portion of said second medium is a boot strap program for loading said operating system into said processor memory.

2. A data processing system as described in claim 1 wherein the data stored in said selected portion of said second medium further comprises data defining the number of times said program stored on said second medium may be executed, said processor during execution of said program stored on said second medium, decrementing said number after each time said program stored on said second medium is executed and, if said decremented number equals zero, erasing said program stored on said second medium from said second medium, and if said decremented number does not equal zero, rewriting said number as said decremented number back to said second medium.

3. A data processing system as described in claim 1 wherein said mass storage means comprises said portable media storage means and said first portable medium stores additional data, said additional data including said operating system.

4. A data processing system as described in claim 2 wherein said mass storage means comprises said portable media storage means and said first portable medium stores additional data, said additional data including said operating system.

5. A data processing system as described in claim 1 wherein said means containing further information for transferring a program from a preselected portion of said portable media further comprises a portion of a phantom read-only-memory.

6. A data processing system as described in claim 2 wherein said means containing further information for transferring a program from a preselected portion of said portable media further comprises a portion of a phantom read-only-memory.

7. A data processing system as described in claim 3 wherein said means containing further information for transferring a program from a preselected portion of said portable media further comprises a portion of a phantom read-only-memory.

8. A data processing system as described in claim 4 wherein said means containing fixed information for transferring a program from a preselected portion of said portable media further comprises a phantom read-only-memory.

9. A data processing system as described in claim 5 wherein said transferring means further comprises an electrically-eraseable-programmable-read-only-memory for storing system parameters defining the availability of said optional programs, said electrically-eraseable-programmable-read-only-memory-comprising a second portion of said phantom read only memory.

10. A data processing system as described in claim 6 wherein said transferring means further comprises an electrically-eraseable-programmable-read-only-memory for storing system parameters defining the availability of said optional programs, said electrically-eraseable-programmable-read-only-memory-comprising a second portion of said phantom read only memory.

11. A data processing system as described in claim 7 wherein said transfer control means further comprises an electrically-eraseable-programable-read-only-memory for storing system parameters defining the availability of said optional programs, said electrically-eraseable-programable-read-only-memory comprising a portion of said phantom read only memory.

12. A data processing system as described in claim 8 wherein said transfer control means further comprises an electrically-ereaseable-programable-read-only-memory for storing system parameters defining the availability of said optional programs, said electrically-eraseable-programable-read-only-memory comprising a portion of said phantom read only memory.

13. A method for initializing a data processing system comprising the steps of:
 (a) loading a portable medium into a portable media storage means for storing data on a selected portable media;
 (b) loading a preselected portion of the data stored on said medium into said system as specified by first information stored in said system, said data comprising a program;
 (c) executing said program to alter nonvolatile information stored in said system;
 (d) halting said system;
 (e) loading a second portable medium into said storage means;
 (f) loading the same preselected portion of the data stored on said second medium into said system as specified by said first information, said second medium data comprising a second program;
 (g) executing said second program to load an operating system into said processor, said operating system loading various optional programs into said system as needed and in accordance with the availability of said optional programs as indicated by said non-volatile information stored in said system.

14. A method as described in claim 13 further comprising the steps of erasing said program from said first portable medium after said program has been executed a preselected number of times.

15. A method as described in claim 14 wherein said first medium contains further information defining the number of times said program may be executed, said said method further comprising the steps of; decrementing said number, checking if said decremented number equals zero, and, if said decremented number equals zero, erasing said program from said first portable medium, and, if said decremented number does not equal zero, rewriting said number as said decremented number back to said first portable medium.

* * * * *